(12) United States Patent
Matoba

(10) Patent No.: US 8,976,638 B2
(45) Date of Patent: Mar. 10, 2015

(54) HOLOGRAPHIC MEMORY INFORMATION ENCODING METHOD, HOLOGRAPHIC MEMORY RECORDING METHOD, AND HOLOGRAPHIC MEMORY DEVICE

(75) Inventor: Osamu Matoba, Kobe (JP)

(73) Assignee: National University Corporation Kobe University, Hyogo (JP)

( * ) Notice: Subject to any disclaimer, the term of this patent is extended or adjusted under 35 U.S.C. 154(b) by 0 days.

(21) Appl. No.: 14/130,445

(22) PCT Filed: Aug. 15, 2012

(86) PCT No.: PCT/JP2012/005161
§ 371 (c)(1),
(2), (4) Date: Dec. 31, 2013

(87) PCT Pub. No.: WO2013/024596
PCT Pub. Date: Feb. 21, 2013

(65) Prior Publication Data
US 2014/0119168 A1    May 1, 2014

(30) Foreign Application Priority Data
Aug. 15, 2011   (JP) ................................ 2011-177787

(51) Int. Cl.
| | | |
|---|---|---|
| G11B 7/00 | (2006.01) |
| G11B 7/007 | (2006.01) |
| G11B 20/18 | (2006.01) |
| G03H 1/26 | (2006.01) |
| G11B 7/0065 | (2006.01) |
| G11B 7/1392 | (2012.01) |

(52) U.S. Cl.
CPC ............ *G11B 7/00772* (2013.01); *G11B 20/18* (2013.01); *G03H 1/2645* (2013.01); *G11B 7/0065* (2013.01); *G11B 2220/2504* (2013.01); *G11B 7/1392* (2013.01); *G03H 2240/13* (2013.01)
USPC ........................................................ 369/103

(58) Field of Classification Search
None
See application file for complete search history.

(56) References Cited

U.S. PATENT DOCUMENTS

| | | | |
|---|---|---|---|
| 8,120,826 B2 | 2/2012 | Matoba et al. | |
| 8,149,486 B2 | 4/2012 | Hara | |
| 2005/0134948 A1* | 6/2005 | Waldman et al. ................. | 359/3 |
| 2009/0262406 A1* | 10/2009 | Hara ............................... | 359/11 |
| 2009/0316240 A1* | 12/2009 | Hara ............................... | 359/33 |

(Continued)

FOREIGN PATENT DOCUMENTS

| | | |
|---|---|---|
| JP | 2001-075463 A | 3/2001 |
| JP | 2010-027188 A | 2/2010 |

*Primary Examiner* — Thang Tran
(74) *Attorney, Agent, or Firm* — Ogilvie Law Firm

(57) ABSTRACT

Provided is an information encoding method and a holographic memory device which increase the amount of information per page of a holographic memory and reduce the bit error rate to ensure a larger multiplexing number. The holographic memory information encoding method expresses information of signal page data in a holographic memory as a multi-stage data using different resolution by block coding, and superimposes each data on a single page of signal page data. The multi-stage data using different resolution is realized by light amplitude data and phase data. The amplitude data is divided by area through block coding. When n odd-numbered ON bits exist in a divided area of the phase data, a phase of $2\pi s/n$ (where n and s are natural numbers) is imparted as s-th phase information to one value of binary data, and the same phase is imparted to the other value of binary data.

10 Claims, 9 Drawing Sheets

(56) References Cited

U.S. PATENT DOCUMENTS

| | | | |
|---|---|---|---|
| 2010/0225985 A1* | 9/2010 | Fukumoto et al. | 359/32 |
| 2011/0273754 A1* | 11/2011 | Shimada et al. | 359/11 |
| 2012/0026856 A1* | 2/2012 | Shimada et al. | 369/103 |
| 2013/0215730 A1* | 8/2013 | Okamoto et al. | 369/103 |

* cited by examiner (1)  (2)

HOLOGRAPHIC MEMORY INFORMATION ENCODING METHOD, HOLOGRAPHIC MEMORY RECORDING METHOD, AND HOLOGRAPHIC MEMORY DEVICE

TECHNICAL FIELD

The present invention relates to an information encoding technology of a holographic memory.

BACKGROUND ART

Nowadays, an incredible amount of information can be obtained from the Internet and high-definition television broadcasting etc., due to the rapid advancement in optical communications technology, computers, and video equipment. In order to record and store the huge amounts of information, there has been an increase in the usefulness of terabyte-class external recording media, besides hard disks by magnetic information recording. Also now, limitations of optical memory technology by shorter wavelengths of light sources are apparent, and research has progressed to further multilayered and three-dimensional optical memories. Under such circumstances, holographic memories capable of parallel readout of image data have been researched domestically and overseas as next-generation recording media having recording capacities exceeding 1 terabyte using the three-dimensional space of the medium and also capable of high-speed readout and transfer at a data transfer speed of 10 gigabits per second.

A holographic memory records an interference pattern formed by a signal light (or object light) and a reference light as a spatial distribution of the refractive index. Here, a holographic memory recording device encodes data two-dimensionally, imparts the coded data to a signal light by a spatial light modulator, and records the same on a recording medium by page. The light modulator has a large number of pixels arrayed in rows and columns, and the individual pixels can independently transmit and block light to two-dimensionally express an arbitrary ON/OFF bit pattern.

A signal light, when being transmitted through the light modulator, is spatially modulated in light intensity according to a two-dimensional pattern of the spatial light modulator. Shifting the incident angle and incident position of the signal light on a holographic memory recording medium enables multiplex recording in a manner superimposed on the same part of the medium, whereby performing large-capacity data recording.

As above, the recording density of a holographic memory is given by the data volume per page and the number of multiplex recordings per unit area. It is essential to increase the number of multiplex recordings in order to realize a recording capacity of 1 TB in a 5-inch disc size. Here, for increasing the number of multiplex recordings, it is necessary to suppress the bit error rate while reducing the recording interval in the thickness direction of a recording layer of the disc. Block coding is used as a method for suppressing the bit error rate.

The block coding is a method of dividing one page into small areas, in which reconstruction of a signal of 0 or 1 is performed. In a holographic memory, 3:16 coding and the like is often used in which only three pixels are lit up in an area of 4×4 (pixels) (refer to, for example, Patent Document 1).

For example, in 2:4 coding in which 2 pixels are lit up among 2×2 (pixels), the number of combinations that can be taken as code patterns is $_4C_2=6$ patterns. Because $2^{2bits}=4$ and $2^{3bits}=8$, a code of 2×2=4 pixels (that is, 4 bits where 1 pixel is 1 bit) is constructed in response to 2 bits of signal data based on 4<6<8. In this case, the coding rate is $2/4=0.5$.

Also, for example, in 2:9 coding in which 2 pixels are lit up among 3×3 (pixels), the number of combinations that can be taken as code patterns is $_9C_2=36$ patterns. Because $2^{5bits}=32$ and $2^{6bits}=64$, a code of 3×3=9 pixels (that is, 9 bits) is constructed in response to 5 bits of signal data based on 32<36<64. In this case, the coding rate is $5/9=0.5556$.

Also, for example, in coding in which 3 pixels are lit up among 4×4 (pixels), the number of combinations that can be taken as code patterns is $_{16}C_3=560$ patterns. Because $2^{9bits}=512$ and $2^{10bits}=1024$, a code of 4×4=16 pixels (that is, 16 bits) is constructed in response to 9 bits of signal data based on 512<560<1024. In this case, the coding rate is $9/16=0.5625$.

That is, in block coding that has been used in holographic memories, the information volume per page becomes approximately ½. As described above, because the recording density of a holographic memory is given by the multiplication of the data volume per page and the number of multiplex recordings per unit area, it has been necessary, in order to increase the recording capacity, to increase the information volume per page and reduce the bit error rate so as to increase a larger multiplexing number.

[Patent Document 1] JPA 2001-75463

OUTLINE OF THE INVENTION

Problems to be Solved by the Invention

In view of the above-mentioned circumstances, it is an object of the present invention to provide an information encoding method, a holographic memory recording method, and a holographic memory device which increase the information volume per page and reduce the bit error rate to ensure a larger multiplexing number, in order to increase the recording capacity of a holographic memory.

Means to Solve the Objects

The present inventor, in order to increase the amount of information per page, has proposed a data expression method using multi-resolution in a page in block coding and superimposing all data with different resolution on a single page of signal page data.

That is, in order to achieve the above-mentioned object, a holographic memory information encoding method according to a first aspect of the present invention is a holographic memory information encoding method which expresses information of signal page data in a holographic memory as a multi-stage data using different resolution by block coding and superimposes each data on a single page of signal page data, in which the different data mentioned above includes at least light amplitude data and phase data, the amplitude data is divided by area through block coding, and when n odd-numbered ON bits exist in a divided area of the phase data, a phase of $2\pi s/n$ (where n and s are natural numbers) is imparted as s-th phase information to one value of binary data, and the same phase is provided for the other value of binary data.

The holographic memory information encoding method according to the first aspect can provide an optimal phase distribution when there are odd-numbered ON bits in block coding. That is, with phase distribution information imparted by the information encoding method according to the first aspect, the amount of information per page can be increased on the order of 10% and the performance of multiplex recording is improved to make it possible to increase the multiplexing number.

Specifically, for the phase data, the block coding is 3:9 coding or 3:16 coding, and 3 ON bits exist in a divided area, a phase of $2\pi s/n$ is imparted as s-th phase information to a data signal value of 0, and the same phase is imparted to a data signal value of 1.

Here, the ON bits that exist in a divided area are a signal light for a holographic memory with an ON/OFF bit pattern added by a spatial light modulator, and ON bits are pixels that are in a light transmitting state among a large number of pixels disposed in a matrix form of the spatial light modulator. In contrast, OFF bits are pixels that are in a light blocking state among a large number of pixels disposed in a matrix form of the spatial light modulator.

A signal light, when being transmitted through the spatial light modulator, is spatially modulated in light intensity according to an ON/OFF two-dimensional pattern on the spatial light modulator. The modulated signal light has been added with amplitude data as information.

Moreover, in the present invention, phase data is further added besides the amplitude data to the signal light for a holographic memory signal. The signal light with amplitude data added as information is transmitted through a modulator for phase modulation. A single modulator that can simultaneously modulate the phase and amplitude may be used. Also, it is also possible to realize a phase delay by control of a polarization state. In that case, the phase is modulated after modulating the amplitude. Here, when the phase is modulated, a phase of $2\pi s/n$ is imparted as s-th phase information to one value of binary data (for example, a data value of 0) serving as phase information, and the same phase is imparted to the other value of binary data (for example, a data value of 1).

Imparting phase information to respective ON bits in a block of the signal light with amplitude data added as information causes an action to obtain an interference signal in the block. That is, a strong interference intensity is obtained in the case of a constructive interference in a block, while a weak interference intensity is obtained in the case of a destructive interference. The obtained interference intensity is captured as an intensity signal by threshold processing to distinguish the signal value (0 or 1) of binary data. Where n ON bits exist as odd-numbered ON bits in a block, when different phases of $2\pi s/n$ (n and s are natural numbers) are imparted to the respective ON bits, a destructive interference occurs in said block to have a weak interference intensity. The interference intensity, when captured as an intensity signal, can be made into information of a data signal value of 0. In contrast, when the same phase is imparted to the respective ON bits, a constructive interference occurs to have a strong interference intensity. The interference intensity, when captured as an intensity signal, can be made into information of a data signal value of 1. For realizing this, a low-frequency transmission filter to extract a 0-order component of a signal in the block is necessary.

With this method, to conventional amplitude modulation, the influence of the phase being superimposed is considered to be small because of detection at the same resolution. On the other hand, as a result of obtaining an interference intensity in a block based on phase information, a two-dimensional code based on the phase that has different resolution can be added besides a conventional two-dimensional code based on the amplitude, so that the amount of information per page is increased.

For example, like 3:16 coding, when 3 ON bits exist in an area of 4×4=16 pixels, in response to a data signal value of 0 serving as phase information, phases of $2\pi/3$, $4\pi/3$, and $2\pi$ are imparted to the respective ON bits as s-th (s is 1, 2, and 3) respectively assigned phase information of the 3 ON bits. On the other hand, in response to a data signal value of 1 serving as phase information, the same phase (for example, a phase of $\pi$ or $2\pi$) is imparted to all 3 ON bits.

In conventional block coding, there is only amplitude information of 0 and 1, but in the information encoding method of the present invention, a new two-dimensional code based on phase information can be added besides a two-dimensional code based on amplitude information.

Also, when n ON bits exist as odd-numbered ON bits in a block, as a result of imparting different phases of $2\pi s/n$ to the respective ON bits, the S/N ratio of signal values of 0 and 1 becomes $n^2$ to 0 to provide the maximum value. As a comparison, for example, in the case of modulation with 0 or $\pi$, the S/N ratio becomes $n^2$ to 1.

In the conventional technique, because block coding is merely performed, the amount of information per page becomes approximately a half as in the foregoing. Because the information encoding of the present invention allows adding a two-dimensional code (0 or 1) based on phase information in every block, 1 bit of information can be further added in every block.

For example, in the case of 3:16 coding, as in the foregoing, the number of combinations that can be taken as code patterns in a block is $_{16}C_3=560$ patterns, and because $2^{9bits}=512$, 9 bits of signal data can be two-dimensionally coded as amplitude information. By the information encoding of the present invention, in addition thereto, 1 bit of information can further be added in every block as phase information, and as a result of adding 1 bit of phase information to the 9 bits of amplitude information, a total of 10 bits of signal data can be implemented. Thus, the coding rate is improved to $10/16=0.625$, and the amount of information per page is increased to lead to an increase in recording capacity.

Also, when n ON bits exist as odd-numbered ON bits in a block, as a result of imparting different phases of $2\pi s/n$ to the respective ON bits, the individual pixel intensities in the block and the cell intensity of every block are increased as compared with when no phase information is added or when modulation with 0 or $\pi$ is added as phase information, so that the bit error rate of the pixel intensity and cell intensity is improved. Here, the cell intensity means a square of the sum of complex amplitudes of individual pixels in a block.

Because the bit error rate of the pixel intensity and cell intensity is improved by addition of phase information, the multiplexing number can be increased. As shown in examples to be described later, an increase in recording capacity of 20% or more has been achieved in simulation.

Next, a holographic memory information encoding method according to a second aspect of the present invention will be described. The holographic memory information encoding method according to the second aspect of the present invention is a holographic memory information encoding method which expresses information of signal page data in a holographic memory as a multi-stage data using different resolution by block coding and superimposes each data on a single page of signal page data, in which the different data mentioned above includes at least light amplitude data and phase data, the amplitude data is divided by area through block coding, and when n even-numbered ON bits exist in a divided area of the phase data, a phase of $\pi s$ or a phase of $2\pi s/n$ (where n and s are natural numbers) is imparted as s-th phase information to one value of binary data, and the same phase is provided for the other value of binary data.

The holographic memory information encoding method according to the second aspect can provide an optimal phase distribution when there are even-numbered ON bits in block coding. That is, with phase distribution information imparted by the information encoding method according to the second aspect, the information volume per page can be increased on the order of 10% and the performance of multiplex recording is improved to make it possible to increase the multiplexing number.

Specifically, for the phase data, the block coding is 2:4 coding or 4:9 coding, and 2 ON bits exist in a divided area, a phase of $\pi s$ or a phase of $2\pi s/n$ is imparted as s-th phase information to a data signal value of 0, and the same phase is imparted to a data signal value of 1.

The same as in the holographic memory information encoding method according to the first aspect applies to the ON bits that exist in a divided area.

In the present invention, phase data is further added besides the amplitude data to the signal light for a holographic memory. The signal light with amplitude data added as information is transmitted through a modulator for phase modulation. A single modulator that can simultaneously modulate the phase and amplitude may be used. In that case, the phase is modulated after modulating the amplitude. Here, when the phase is modulated, a phase of $\pi s$ or a phase of $2\pi s/n$ is imparted as s-th phase information to one value of binary data (for example, a data value of 0) serving as phase information, and the same phase is imparted to the other value of binary data (for example, a data value of 1).

Similar to the holographic memory information encoding method according to the first aspect, imparting phase information to respective ON bits in a block of the signal light with amplitude data added as information causes an action to obtain an interference signal in the block. Accordingly, a two-dimensional code based on the phase can be added besides a conventional two-dimensional code based on the amplitude, and the amount of information per page is increased.

For example, like 2:4 coding, when 2 ON bits exist in an area of 2×2=4 pixels, in response to a data signal value of 0 serving as phase information, phases of $\pi s$ are imparted to the respective ON bits as s-th (s is 1 and 2) respectively assigned phase information of the 2 ON bits. On the other hand, in response to a data signal value of 1 serving as phase information, the same phase (for example, a phase of $\pi$ or $2\pi$) is imparted to all 2 ON bits.

In addition, as compared with the holographic memory information encoding method according to the first aspect, with the holographic memory information encoding method according to the second aspect, the S/N ratio of signal values of 0 and 1 becomes $n^2$ to 1 as phase information, and the S/N ratio of phase information is thus slightly degraded.

However, for example, in the case of 2:4 coding, as in the foregoing, the number of combinations that can be taken as code patterns in a block is $_4C_2=6$ patterns, and because $2^{2bits}=4$, 2 bits of signal data can be two-dimensionally coded as amplitude information. By the information encoding of the present invention, in addition thereto, 1 bit of information can further be added in every block as phase information, and as a result of adding 1 bit of phase information to the 2 bits of amplitude information, a total of 3 bits of signal data can be added. Thus, the coding rate is greatly improved to ¾=0.75, and the amount of information per page is remarkably increased.

Next, a holographic memory device of the present invention will be described. The holographic memory device of the present invention is a holographic memory device which records image data as an optical interference pattern by irradiating a disk-shaped recording medium with a signal light and a reference light, and reproduces data from a reconstructed image that is obtained by irradiating the disk-shaped recording medium with a reference light, and includes the following 1) to 5).

1) A motion mechanism of an optical pickup system
2) A system that guides a signal light and a reference light to align the signal light and the reference light in polarization plane on the disk-shaped recording medium
3) An amplitude modulation means provided in a light guide of a signal light
4) A phase modulation means provided in a light guide of a signal light
5) A spatial shift multiplex recording means by displacement of a reference light using the motion mechanism of an optical pickup system Moreover, the phase modulation means mentioned in the above 4), when n odd-numbered ON bits exist in an area for which holographic amplitude data is divided by block coding, imparts a phase of $2\pi s/n$ (where n and s are natural numbers) as s-th phase information to one value of binary data, and imparts the same phase to the other value of binary data.

Also, the motion mechanism of an optical pickup system means a rotating mechanism of a disk-shaped recording medium and a moving mechanism in the radial direction of a disk-shaped recording medium. For performing multiplexing using the disk rotation and the shift of an optical pickup system, a speckle shift multiplex recording means is used that performs multiplexing by displacement of a speckle reference light. The speckle shift multiplex recording means is one for multiplexing using shift Bragg selectivity due to a speckle light that is used as a reference light, by recording a signal light and a reference light in a spatially shifted manner, and that at the time of readout, allows performing independent readout as a result of only data that is coincident in shift Bragg selectivity being made into diffracted light by slightly changing the reference light in spot position.

The holographic memory device of the present invention, by including the phase modulation means mentioned in the above 4), can add a new two-dimensional code based on phase information besides a two-dimensional code based on amplitude information. Because 1-bit information can be added in every block as interference intensity information due to the phase besides a conventional two-dimensional code based on the amplitude, the amount of information per page is increased. Also, because the bit error rate of the pixel intensity and cell intensity is improved by addition of phase information, the multiplexing number can be increased. Thus, in the holographic memory device of the present invention, the recording capacity of a holographic memory can be increased from that of the conventional device.

Also, in a holographic memory device of another aspect of the present invention, the phase modulation means mentioned in the above 4), when n even-numbered ON bits exist in an area for which holographic amplitude data is divided by block coding, imparts a phase of $\pi s$ or a phase of $2\pi s/n$ (where n and s are natural numbers) as s-th phase information to one value of binary data, and imparts the same phase to the other value of binary data.

Similarly, a holographic memory device of the present invention according to an another aspect, by including the phase modulation means mentioned in the above 4), also can add a new two-dimensional code based on phase information besides a two-dimensional code based on amplitude information, and the information volume per page can be increased. Also, the bit error rate of the pixel intensity and cell intensity is improved by addition of phase information, and the multiplexing number can be increased.

It is preferable that the holographic memory device of the present invention mentioned above further include a confocal optical system, in which the multiplexing number is increased by removing a high-frequency component in recording using the confocal optical system mentioned above and passing only a signal component in readout process to reduce crosstalk noise.

Using a confocal optical system allows removing a high-frequency component at an aperture in recording and removing adjacent data at an aperture in readout process to reduce crosstalk noise. As a result, the multiplexing number can be increased.

That is, by adding a two-dimensional code based on phase information besides a two-dimensional code based on amplitude information to increase the amount of information per page and further increasing the multiplexing number using a confocal optical system, an increase in the recording capacity of a holographic memory can be achieved.

In a holographic memory recording method of the present invention, the multiplexing number is increased, using the holographic memory information encoding method of the present invention described above, by increasing the amount of information of a single page of page data, performing spatial shift multiplex recording, and removing a high-frequency component in recording using a confocal optical system and passing only a signal component in readout process to reduce crosstalk noise, whereby the recording capacity of a holographic memory is increased.

Here, the spatial shift multiplex recording is a recording method in which a recording medium is moved by a slight amount at every recording of page data to use a relative positional shift between the recording medium and reference light. Also, the speckle shift multiplex recording is shift multiplex recording in which random phase modulation is applied to the reference light.

Effects of the Invention

The present invention provides an effect of increasing the amount of information per page of a holographic memory and reducing the bit error rate to ensure a larger multiplexing number.

BEST MODE FOR CARRYING OUT THE INVENTION

Figure 1:
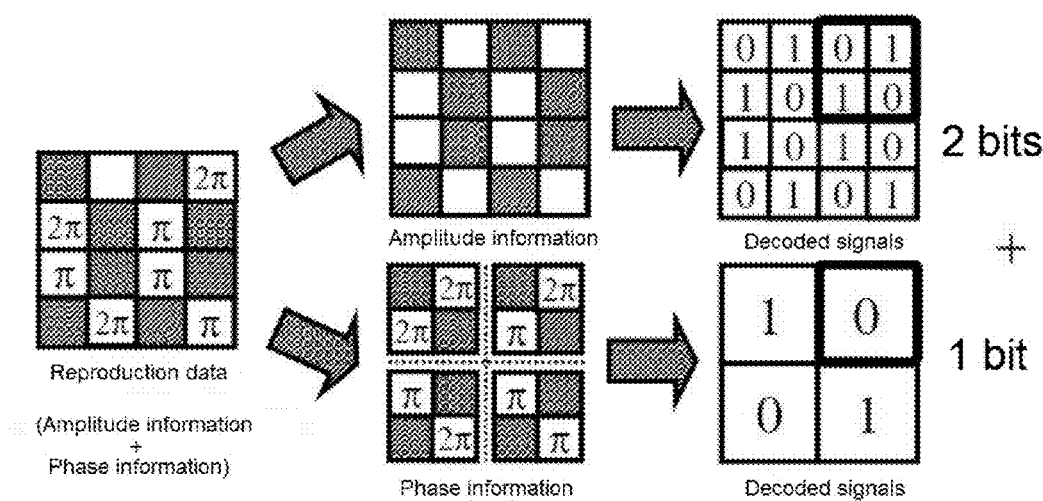
FIG. 1 is an explanatory view of phase information to be superimposed on a 2:4 coding block.

Embodiments of the present invention will be described in detail below with reference to the drawings. The present invention is not limited to the following embodiment and examples of shown in the figure, and the present invention can be variously changed in design.

Embodiment 1

A holographic memory information encoding method of Example 1 expresses data per page as two stages of data information with different resolutions by block coding in order to increase the information volume per page. The two stages of data information are amplitude data information and phase data information. The amplitude data information and phase data information are different in the number of pixels used in data information, and are data with different resolutions. The amplitude data information and phase data information can be superimposed on a single page of signal page data.

A signal light for a holographic memory is imparted with amplitude data after passing through an amplitude modulator. The signal light for a holographic memory is divided by area through block coding, and phase data is imparted to ON bits of a divided block.

Table 1 below shows the difference in coding rate according to the type of modulation code. Five types of 2:4 coding, 2:9 coding, 3:9 coding, 4:9 coding, and 3:16 coding are shown as the modulation codes. The numbers of combinations that amplitude data in one block in each block coding can take as code patterns are 6, 36, 84, 126, and 560. However, the numbers of combinations that phase data can take as code patterns are two patterns, 0 or 1, when whether interference is destructive or constructive is distinguished by on a threshold. The numbers of combinations that one block in block coding can take as code patterns are products of multiplication of the number of combinations of amplitude data and the number of combinations of phase data, and are 12, 72, 168, 252, and 1120, respectively.

The number of bits that can be expressed by one block in block coding is as in the following (a) to (e).

(a) In the case of 2:4 coding, because $2^{3bits}=8$ and $2^{4bits}=16$, the number of bits of signal data that can be expressed is 3 bits based on 8<12<16.

(b) In the case of 2:9 coding, because $2^{6bits}=64$ and $2^{7bits}=128$, the number of bits of signal data that can be expressed is 6 bits based on 64<72<128.

(c) In the case of 3:9 coding, because $2^{7bits}=128$ and $2^{8bits}=256$, the number of bits of signal data that can be expressed is 7 bits based on 128<168<256.
(d) In the case of 4:9 coding, because $2^{7bits}=128$ and $2^{8bits}=256$, the number of bits of signal data that can be expressed is 7 bits based on 128<252<256.
(e) In the case of 3:16 coding, because $2^{10bits}=1024$ and $2^{11bits}=2048$, the number of bits of signal data that can be expressed is 10 bits based on 1024<1120<2048.

Thus, the coding rate by each block coding is as in the following (A) to (E).
(A) In the case of 2:4 coding, because a code of 2×2=4 pixels (that is, 4 bits where 1 pixel is 1 bit) is constructed in response to 3 bits of signal data, the coding rate is 3/4=0.75.
(B) In the case of 2:9 coding, because a code of 3×3=9 pixels (that is, 9 bits) is constructed in response to 6 bits of signal data, the coding rate is 6/9=0.67.
(C) In the case of 3:9 coding, because a code of 3×3=9 pixels (that is, 9 bits) is constructed in response to 7 bits of signal data, the coding rate is 7/9=0.78.
(D) In the case of 4:9 coding, because a code of 3×3=9 pixels (that is, 9 bits) is constructed in response to 7 bits of signal data, the coding rate is 7/9=0.75.
(E) In the case of 3:16 coding, because a code of 4×4=16 pixels (that is, 16 bits) is constructed in response to 10 bits of signal data, the coding rate is 10/16=0.625.

TABLE 1

| Modulation code | 2:4 | 2:9 | 3:9 | 4:9 | 3:16 |
|---|---|---|---|---|---|
| Amplitude coding | $_4C_2=$ 6 | $_9C_2=$ 36 | $_9C_3=$ 84 | $_9C_4=$ 126 | $_{16}C_3=$ 560 |
| Phase coding | 2 | 2 | 2 | 2 | 2 |
| Total combinations | 12 | 72 | 168 | 252 | 1120 |
| Number of bits | 3 | 6 | 7 | 7 | 10 |
| Coding rate | 3/4 = 0.75 | 6/9 = 0.67 | 7/9 = 0.78 | 7/9 = 0.78 | 10/16 = 0.625 |

Phase information to be superimposed on a 2:4 coding block will be described with reference to FIG. 1.

In the case where the block coding is 2:4 coding, 2 ON bits exist in a block. When a data signal value of 0 is imparted as phase information to the 2 ON bits, a phase of $\pi\times 1=\pi$ or a phase of $2\pi\times\frac{1}{2}=\pi$ is imparted to one ON bit (first bit). Also, to the other ON bit (second bit), a phase of $\pi\times 2=2\pi$ or a phase of $2\pi\times 2/2=2\pi$ is imparted. A destructive interference accordingly occurs for a signal of the ON bits in the block, so that a weak interference intensity is obtained. Thus, the interference intensity obtained from said block has a signal value of 0 of binary data when this is captured as an intensity signal by threshold processing.

On the other hand, when a data signal value of 1 is imparted as phase information to the 2 ON bits, the same phase is imparted to each of the 2 ON bits in the block. A constructive interference accordingly occurs for a signal of the ON bits in the block, so that a strong interference intensity is obtained. Thus, the interference intensity obtained from said block has a signal value of 1 of binary data when this is captured as an intensity signal by threshold processing.

FIG. 1 shows a state in which, with respect to image data of 4×4 pixels of blocks arranged in a 2 by 2 matrix for each (image data of 2×2 pixels) of which amplitude information and phase information are superimposed using 2:4 coding, the amplitude information and phase information are taken out of reproduction data to respectively generate decoded signals.

Next, phase information to be superimposed on a 3:16 coding block will be described with reference to FIG. 2.

In the case where the block coding is 3:16 coding, 3 ON bits exist in a block. When a data signal value of 0 is imparted as phase information to the 3 ON bits, a phase of $2\pi\times\frac{1}{3}=2\pi/3$ is imparted to any ON bit (first bit). Also, to another ON bit (second bit), a phase of $2\pi\times\frac{2}{3}=4\pi/3$ is imparted. Also, to the remaining ON bit (third bit), a phase of $2\pi\times 3/3=2\pi$ is imparted. A destructive interference accordingly occurs for a signal of the 3 ON bits in the block, so that a weak interference intensity is obtained. Thus, the interference intensity obtained from said block has a signal value of 0 of binary data when this is captured as an intensity signal by threshold processing.

On the other hand, when a data signal value of 1 is imparted as phase information to the 3 ON bits, the same phase is imparted to each of the 3 ON bits in the block. A constructive interference accordingly occurs for a signal of the ON bits in the block, so that a strong interference intensity is obtained. Thus, the interference intensity obtained from said block has a signal value of 1 of binary data when this is captured as an intensity signal by threshold processing.

Figure 2:
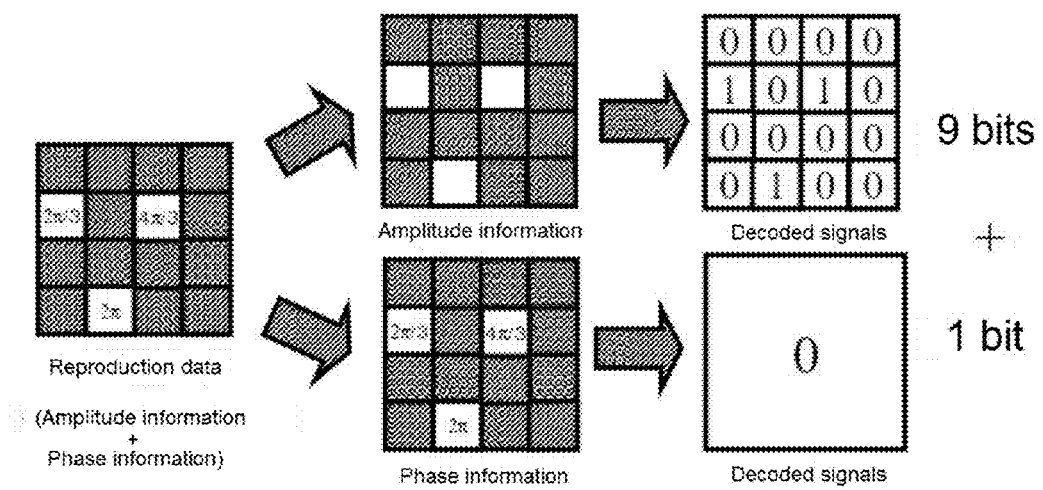
FIG. 2 is an explanatory view of phase information to be superimposed on a 3:16 coding block.

FIG. 2 shows a state in which, with respect to one block (image data of 4×4 pixels) for which amplitude information and phase information are superimposed using 3:16 coding, the amplitude information and phase information are taken out of reproduction data to respectively generate decoded signals.

Figure 3:
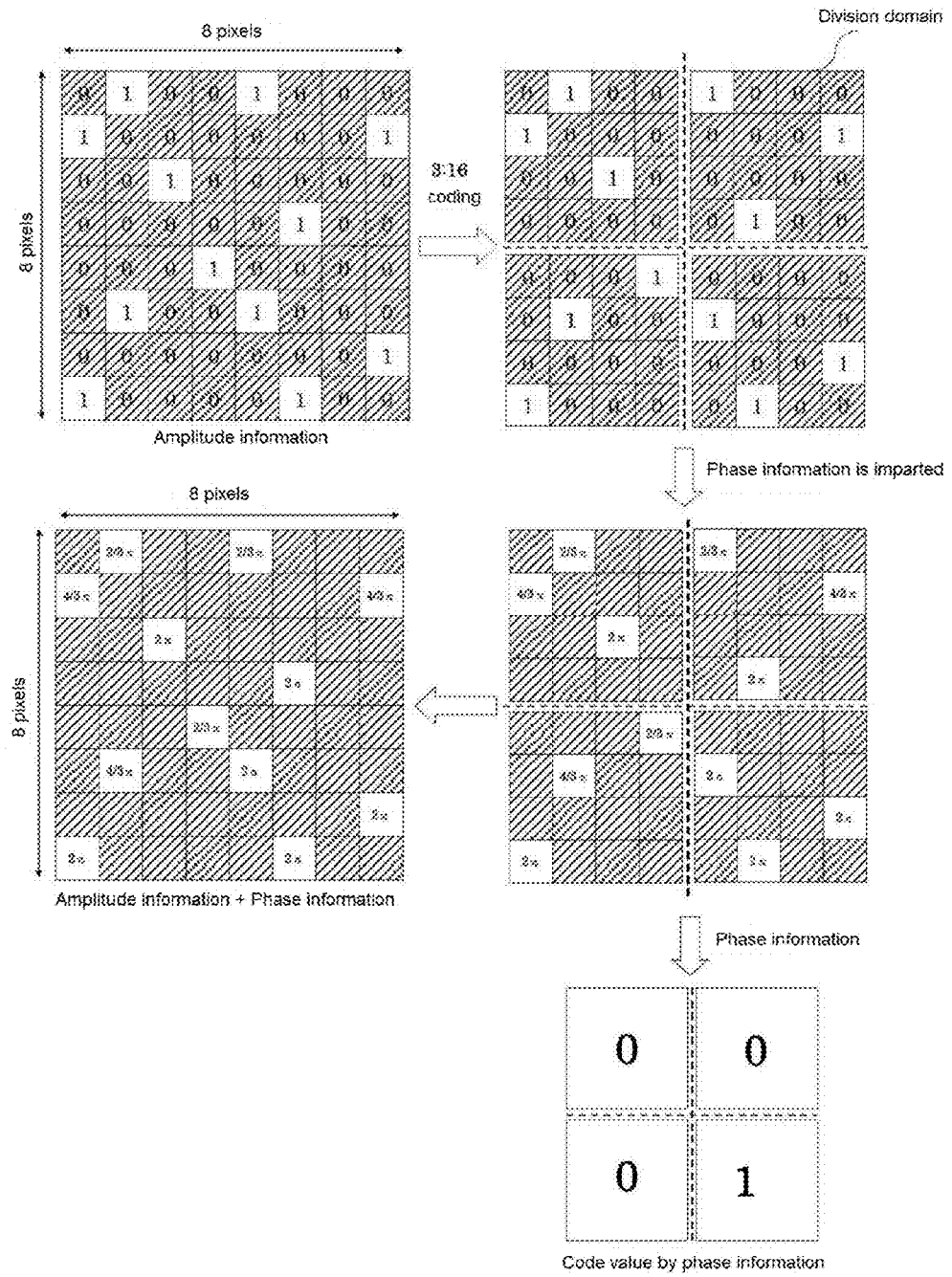
FIG. 3 is an explanatory view of an information encoding method of the present invention (case of 3:16 coding).

FIG. 3 is an explanatory view of the information encoding method of the present invention (case of 3:16 coding). FIG. 3 shows a state in which phase information is superimposed besides amplitude information in the case of two-dimensional coding of a signal light of 8×8 pixels=64 pixels using 3:16 coding. In the case of 3:16 coding, 3 ON bits exist in a block of 4×4 pixels. When a data signal value of 0 is imparted as phase information to the 3 ON bits, phases of $2\pi/3$, $4\pi/3$, and $2\pi$ are imparted to the respective ON bits. A destructive interference accordingly occurs for a signal of the 3 ON bits in the block, so that a weak interference intensity is obtained, and the interference intensity has a data signal value of 0 when this is captured as an intensity signal by threshold processing. When a data signal value of 1 is imparted as phase information to the 3 ON bits, the same phase such as $\pi$ or $2\pi$ is imparted to the 3 ON bits in the block. A constructive interference accordingly occurs for a signal of the ON bits in the block, so that a strong interference intensity is obtained, and the interference intensity has a data signal value of 1 when this is captured as an intensity signal by threshold processing.

Figure 4:
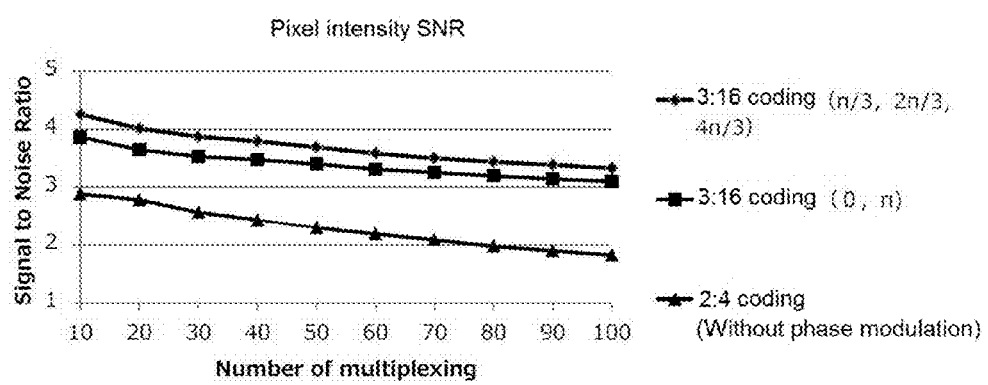
FIG. 4 shows comparative graphs of the pixel intensity SNR.
Figure 5:
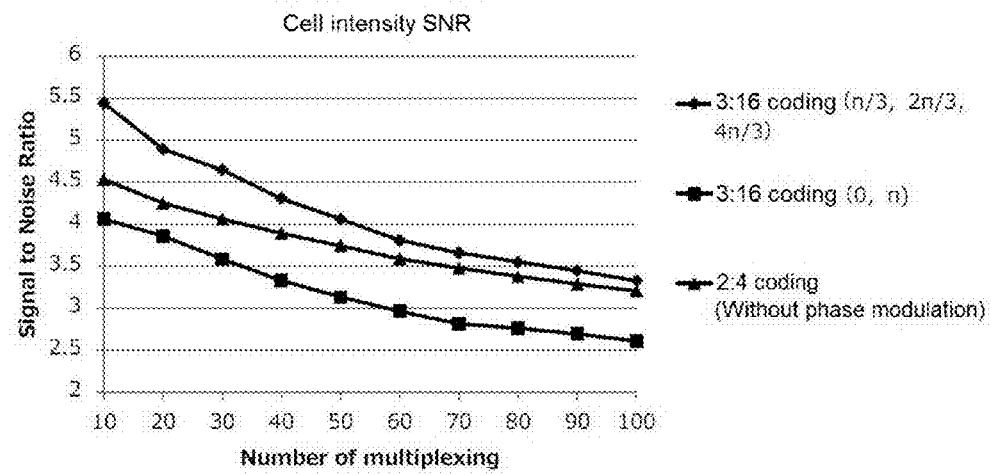
FIG. 5 shows comparative graphs of the cell intensity SNR.
Figure 6:
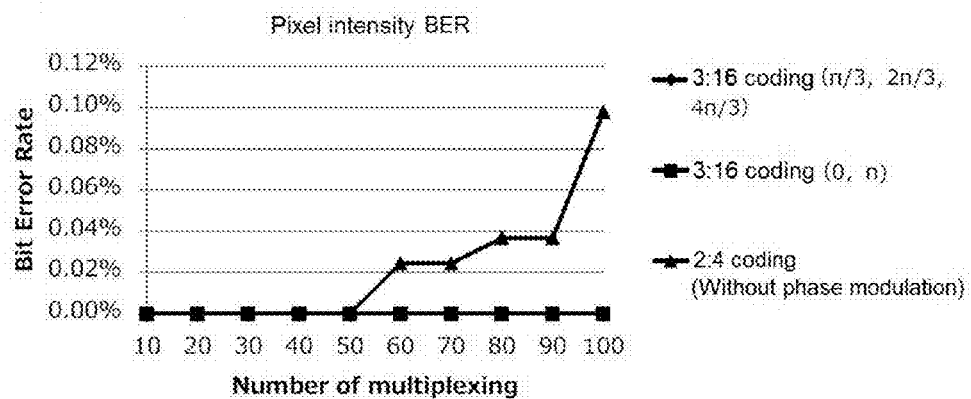
FIG. 6 shows comparative graphs of the pixel intensity BER.
Figure 7:
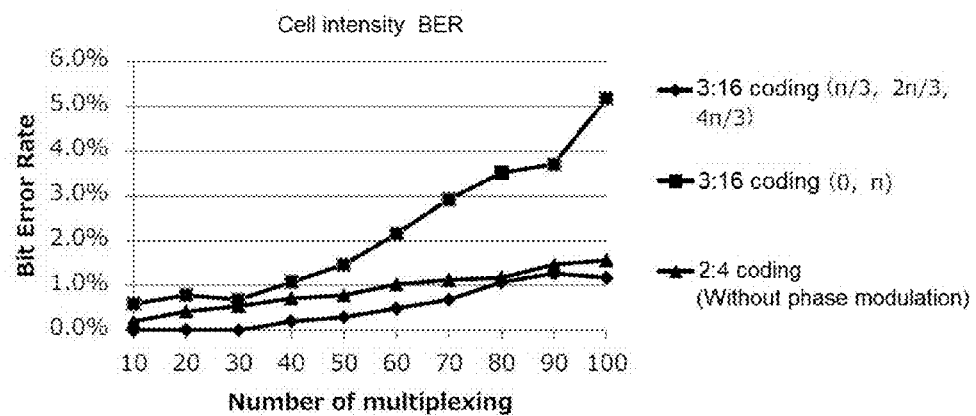
FIG. 7 shows comparative graphs of the cell intensity BER.

Next, the bit error rate and signal to noise ratio of low-resolution data will be described with reference to FIG. 4 to FIG. 7. FIG. 4 shows comparative graphs of the pixel intensity SNR (Signal to Noise Ratio), and FIG. 5 shows comparative graphs of the cell intensity SNR. Also, FIG. 6 shows comparative graphs of the pixel intensity BER (Bit Error Rate), and FIG. 7 shows comparative graphs of the cell intensity BER. In all graphs of FIG. 4 to FIG. 7, the horizontal axis shows the multiplexing number of 10 to 100. Also, the respective graphs show data of 2:4 coding only with amplitude information and without phase information, 3:16 coding (when the imparted phase is 0 and $\pi$) with phase information as well as amplitude information, and 3:16 coding (when the imparted phase is $2\pi/3$, $4\pi/3$, and $2\pi$) with phase information as well as amplitude information.

It can be understood from FIG. 4 that the pixel intensity SNR has been improved in S/N in 3:16 coding with phase information as well as amplitude information as compared with 2:4 coding only with amplitude information and without phase information. Also, it can be understood that S/N has been improved, as compared with the case of modulation with 0 or π, in the case of 3:16 coding in which different phases of 2πs/n were imparted to respective ON bits. This is because the S/N ratio of signal values of 0 and 1 becomes $n^2$ to 0 as a result of imparting different phases of 2πs/n to respective ON bits, while in the case of modulation with 0 or π, the S/N ratio becomes $n^2$ to 1.

Also, it can be understood from FIG. 5 that the cell intensity SNR has been improved in S/N in 3:16 coding with phase information as well as amplitude information as compared with 2:4 coding only with amplitude information and without phase information. Here, the cell intensity is a square of the sum of complex amplitudes of individual pixels in a block. In the case of 3:16 coding, the cell intensity is a square of the sum of complex amplitudes in 4×4 pixels, and in the case of 2:4 coding, the cell intensity is a square of the sum of complex amplitudes in 2×2 pixels. The complex amplitude is expressed in a form of a×exp(i×b). Here, a represents the amplitude, and b represents the phase.

Also, from FIG. 6, the pixel intensity BER is inferior in 2:4 coding only with amplitude information and without phase information, and is excellent in 3:16 coding with phase information as well as amplitude information irrespective of the phase imparted.

Also, from FIG. 7, the cell intensity BER is the most inferior in 3:16 coding (when the imparted phase is 0 and π), and excellent in 2:4 coding only with amplitude information and without phase information and 3:16 coding (when the imparted phase is 2π/3, 4π/3, and 2π). 3:16 coding (when the imparted phase is 2π/3, 4π/3, and 2π) shows the most excellent values.

It can be understood from the analysis results shown in FIG. 4 to FIG. 7 that 3:16 coding (when the imparted phase is 2π/3, 4π/3, and 2π) is the most excellent in S/N of both the pixel intensity and cell intensity and is also excellent in bit error rate. Thus, in the case of 3:16 coding, it is more excellent in S/N and bit error rate to impart different phases of 2π/3, 4π/3, and 2π to the 3 ON bits present in a block than imparting phases of 0 and π.

Next, description will be given of the results of an analysis of speckle shift multiplex recording performed, for 3:16 coding performed for a signal light having a data size of 512×512 pixels, by computer simulation under the conditions shown in Table 2 below.

TABLE 2

| | |
|---|---|
| Wavelength of Source light | 532 [nm] |
| Analysis region | 16.384 × 16.384 [mm] = 1024 × 1024 [pixel] |
| Signal light | |
| Data size | 8.192 × 8.192 [mm] = 128 × 128 [bit] = 512 × 512 [pixel] |
| Bit size | 64 × 64 [um] = 4 × 4 [pixel] |
| Incidence angle | 0 [deg] |
| Coding | 3:16 coding |
| Reference light | Speckle wave |
| Beam diameter (input side) | 56 × 56 [mm] = 3500 × 3500 [pixel] |
| Incidence angle | 135 [deg] |
| Recording medium | |
| Thickness | 500 [um] |
| Divide number | 500 |
| Average of refractive index | 1.5 |

TABLE 2-continued

| | |
|---|---|
| Maximum change of refractive index | $10^{-4}$ |
| Shrinkage | Nothing |
| Lens | |
| Focal length | 10 [mm] |
| Numerical aperture | 0.38 |

Figure 9:
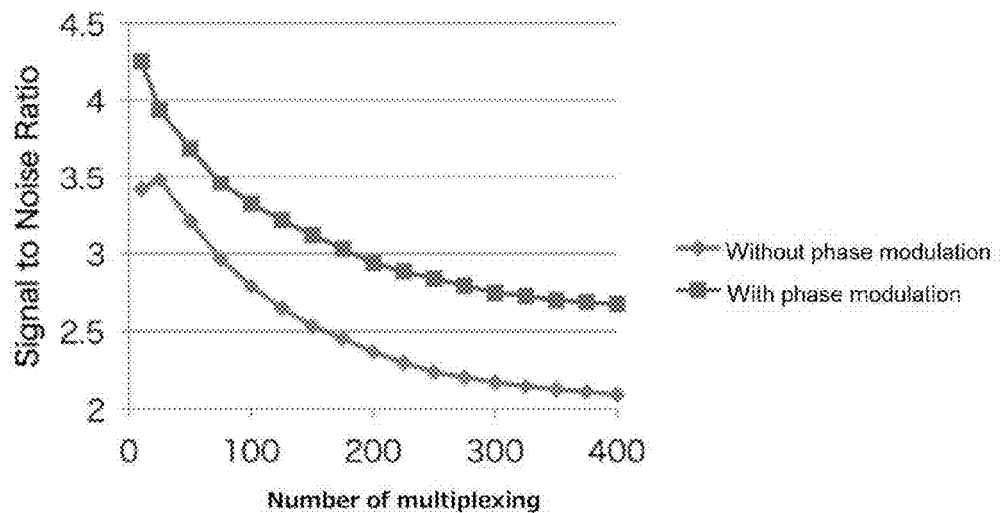
FIG. 9 shows reproduction accuracy comparison graphs of the pixel intensity in simulation results.
Figure 10:
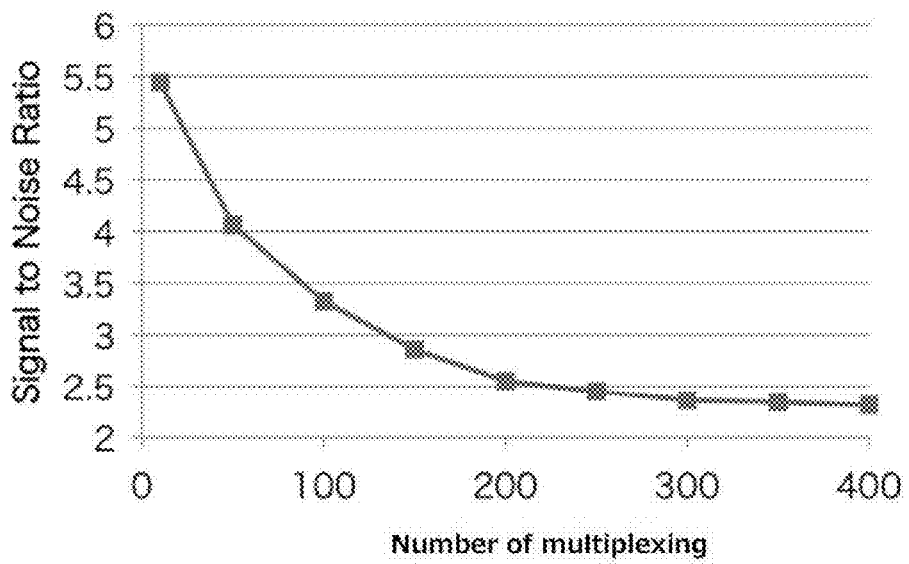
FIG. 10 shows a reproduction accuracy comparison graph of the cell intensity in simulation results. (1)
Figure 11:
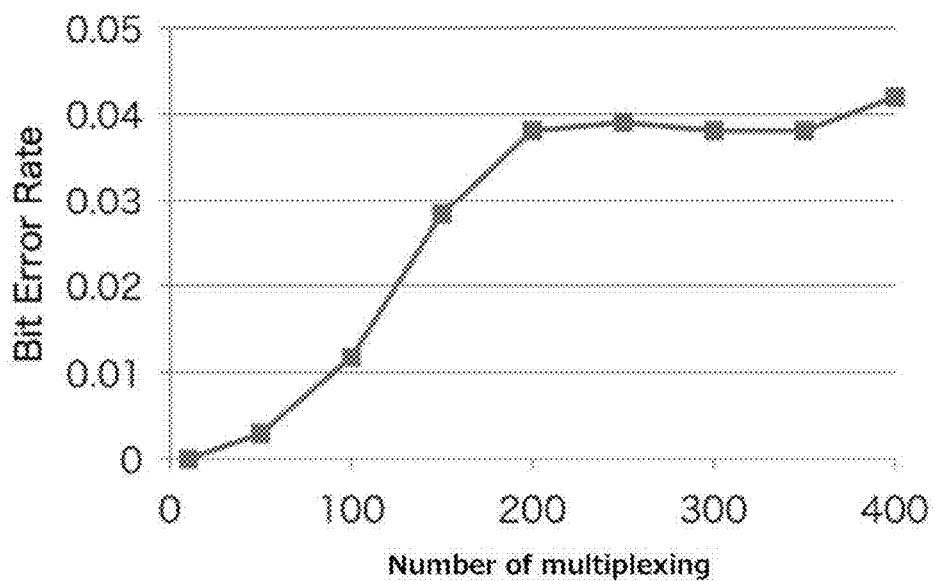
FIG. 11 shows a reproduction accuracy comparison graph of the cell intensity in simulation results. (2)

FIG. 9 shows comparison graphs of reconstruction data of the pixel intensity in simulation results. FIG. 9 shows the SNR of the pixel intensity. Also, FIG. 10 and FIG. 11 show comparison graphs of reconstruction data of the cell intensity in simulation results. FIG. 10 shows the SNR of the cell intensity, and FIG. 11 shows the BER of the cell intensity.

It can be understood from the graph of the pixel intensity SNR shown in FIG. 9 that the SNR is improved by introduction of phase modulation due to the influence of a remaining diffraction efficiency.

It can be understood from the graph of the cell intensity SNR shown in FIG. 10 that the SNR can be maintained at 2.0 or more even when the multiplexing number is 400. Also, it can be understood from the graph of the cell intensity BER shown in FIG. 10 that if the allowable BER is set as 10%, it is in the allowable range even when the multiplexing number is 400.

Based on the above, the analysis results by computer simulation are as follows.

The data size of a signal light is 512×512 pixels, and 128 blocks are formed by 3:16 coding. An information volume of 9 bits can be imparted with only amplitude information per block in 3:16 coding. Therefore, the amount of information per page is 1152 (Bytes) in the case with only amplitude information, but it increases to 1280 (Bytes) when phase information is added to the amplitude information. The amount of information per page is (128×128/8) (Bytes)×(9/16)= 1152 (Bytes) in the case with only amplitude information, but it increases to (128×128/8) (Bytes)×(10/16)=1280 (Bytes) when phase information is added to the amplitude information.

It is thus understood by a comparison in the amount of information per page that 3:16 coding leads to an increase in recording capacity of 10% or more.

Figure 8:
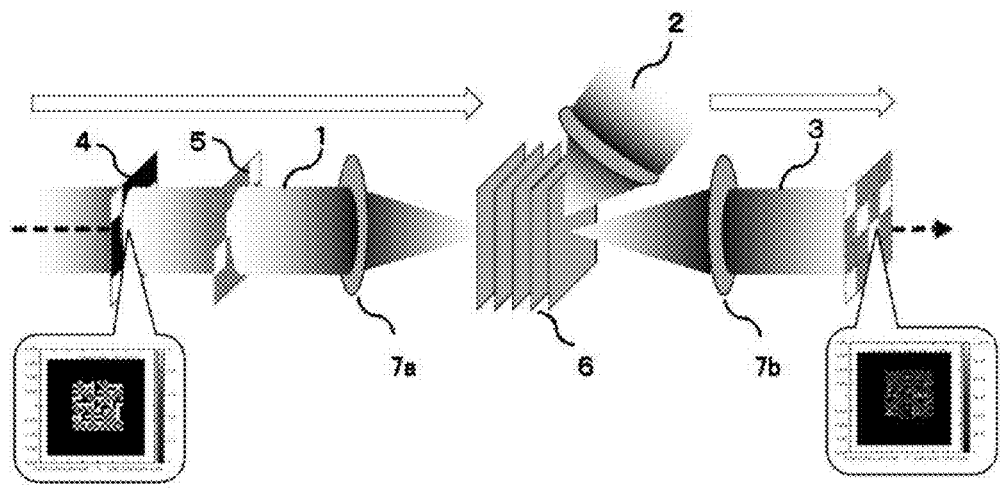
FIG. 8 is a schematic view of a holographic memory device of the present invention.

FIG. 8 shows a schematic view of a holographic memory device of the present invention. The holographic memory device of the present invention requires a system that guides a signal light 1 and a reference light 2 to align the signal light 1 and the reference light 2 in polarization plane on a recording medium 6, an optical amplitude modulator 4 provided in a light guide of the signal light 1, and an optical phase modulator 5 provided in a light guide of the signal light 1.

In the process of recording the signal light 1 on the recording medium 6, Fourier transform by a focusing lens 7a is performed. Also, in the process of reproducing a reproduction light 3 from the recording medium 6, Fourier transform by a focusing lens 7b is performed.

In addition, the recording medium 6 shown in FIG. 8 is divided into thin layers in order to implement a volume effect of holograms in performing a numerical analysis, but it is not particularly necessary to divide the same into layers.

Embodiment 2

In Example 2, description will be given of the fact that the recording density of a holographic memory can be increased by introducing a confocal optical system.

The confocal optical system is advantageous for a holographic memory in that a high-frequency component can be removed at an aperture in recording and that only a signal component can be passed by removing adjacent data at an aperture in readout process so as to reduce crosstalk noise.

The holographic memory records high-density information into a crystal or photopolymer. Because a spatial light modulation element being a display element has a periodic structure in recording, a high-frequency component is generated. By removing the high-frequency component at an aperture, extra spending of the photopolymer can be eliminated.

Figure 12:
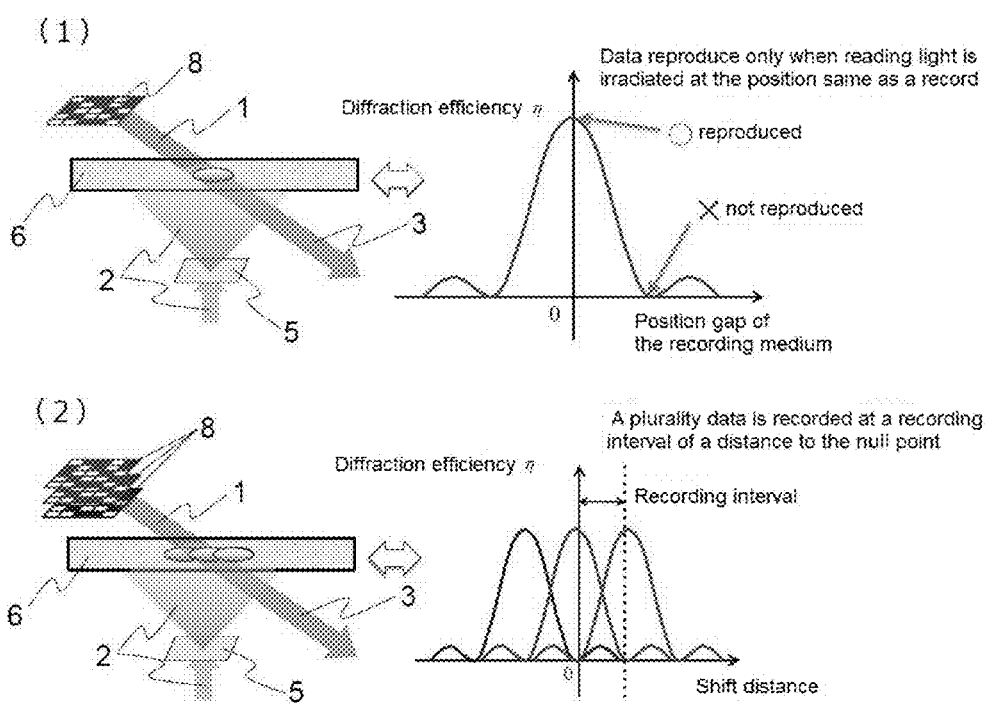
FIG. 12 includes explanatory views of shift multiplex recording.

FIG. 12 shows single recording (refer to FIG. 12 (1)) and shift multiplex recording (refer to FIG. 12 (2)) of a holographic memory. In shift multiplex recording is recording, signal page data is recorded in a spatially overlapping manner at a recording interval of a distance to the null point (local minimum point of diffracted light intensity) into a photopolymer being a recording medium. In FIG. 12, reference numeral 1 denotes a signal light, reference numeral 2 denotes a reference light, reference numeral 3 denotes a reproduction light, reference numeral 5 denotes a random phase mask being an optical phase modulator, reference numeral 6 denotes a recording medium, and reference numeral 8 denotes input signal page data.

In shift multiplex recording, speckle shift multiplex recording is used in which random phase modulation is applied to a reference light to have stricter phase matching conditions in reproduction. The random phase modulation is provided by a phase modulator, a diffusion plate, a multimode fiber, or the like.

Figure 13:
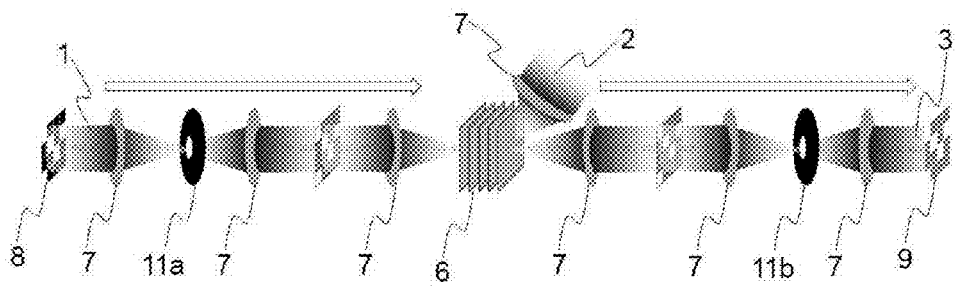
FIG. 13 is a configuration view (development) of a confocal optical system.

FIG. 13 shows a configuration view (development) of the confocal optical system. As shown in the figure, a system at both sides of a recording side and a reproducing side of which apertures are disposed is the confocal optical system. The recording side serves to cut a high-frequency component, and the reproducing side serves to reduce crosstalk noise. In the confocal optical system of FIG. 13, reference numeral 7 denotes a focusing and collimating lens, and reference numerals 11a and 11b denote an aperture at the recording side and an aperture at the reproducing side, respectively. The signal light 1 from the input signal page data 8 passes through the focusing lenses 7 and the aperture 11a to be recorded on the recording medium 6. On the other hand, the reproduction light 3 passes through the focusing and collimating lenses 7 and the aperture 11b to reproduce reproduced signal page data 9 with reduced crosstalk noise. A reflection-type configuration allows including a single aperture.

Figure 14:
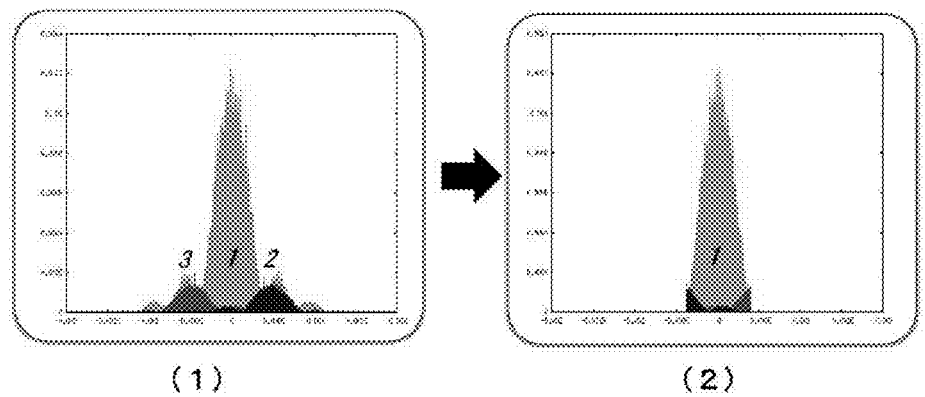
FIG. 14 includes graphs of the diffracted light intensity distribution in recording before and after passing through an aperture.

FIG. 14 shows graphs of the diffracted light intensity distribution before and after passing through an aperture. It can be understood from FIG. 14 (2) that, after passing through an aperture, only a signal component (reference numeral 1 in the figure) has been passed to reduce crosstalk noise (reference numerals 2 and 3 in the figure) by eliminating additional recording of these higher frequency component.

Figure 15:
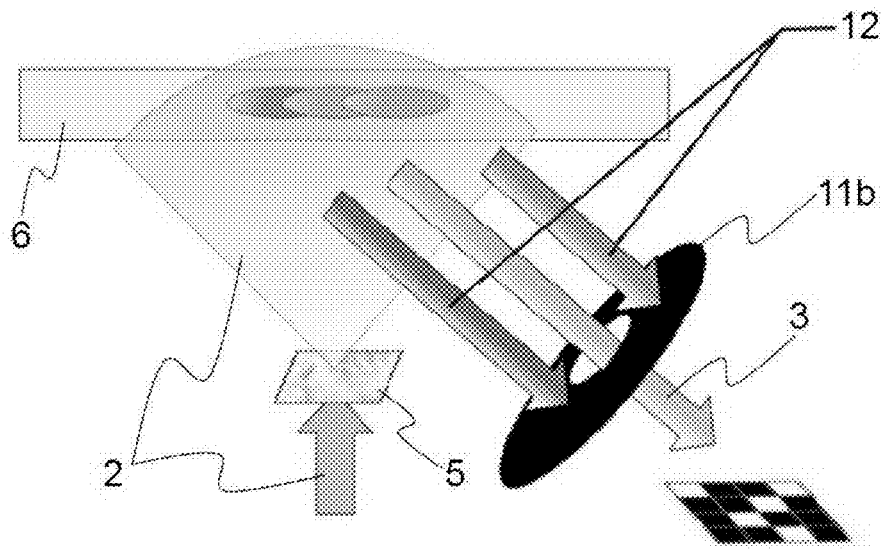
FIG. 15 is an explanatory view of a state in which crosstalk noise is reduced in readout process by an aperture.

FIG. 15 shows a state in which crosstalk noise 12 is reduced from the reproduction light 3 in reproduction by using the aperture 11b.

Figure 16:
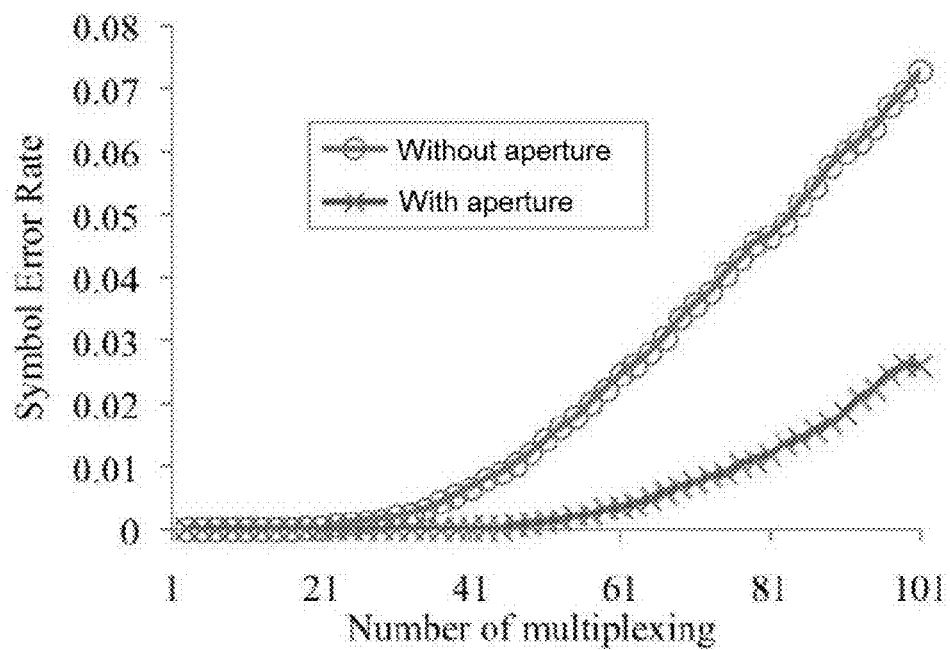
FIG. 16 shows graphs of the bit error rate to the multiplexing number (comparison graphs depending on with and without an aperture).

FIG. 16 shows graphs of the bit error rate to the multiplexing number (comparison graphs depending on with and without an aperture). Analysis condition parameters for simulation are shown in Table 3 below.

TABLE 3

| Signal size | 256 × 256 bit = 3.5 × 3.5 mm |
|---|---|
| Signal incident degree | 0 deg |
| Signal Coding | No coding |
| Reference beam | Speckle wave |

TABLE 3-continued

| | 135 deg |
|---|---|
| Storage medium | 0.5 mm |
| Divide number | 500 |
| Lens focal length | 10 mm |
| Lens NA | 0.17 |
| Wave length | 532 nm |

It can be understood from the graphs of FIG. 16 that, in the case of number of multiplex recording of 101 performed on a recording medium, the bit error rate has changed approximately 3 times depending on with and without an aperture. Also, it can be understood from the graphs of FIG. 16 that, on the assumption of an allowable error rate of 1%, the achievable multiplexing number can be increased from 45 multiplexing to 71 multiplexing.

Because the data volume per page is 8192 (bytes), it could be increased from 125.5 (GBytes) to 197.9 (GBytes) in terms of the recording capacity of a 5-inch disc. It can be understood from this fact that the confocal optical system is effective.

INDUSTRIAL APPLICABILITY

The present invention is useful for information encoding of a holographic memory. At present, it has been aimed for a holographic memory to realize a recording capacity of 1 terabyte in a 5-inch disc. It is therefore necessary to set the upper limit of the capacity to the order of 10 terabytes. For that purpose, the present invention can increase the recording capacity as compared with a conventional method and is therefore useful.

DESCRIPTION OF SYMBOLS 1 signal light
2 reference light
3 reproduction light
4 optical amplitude modulator
5 optical phase modulator
6 recording medium
7a, 7b, 7c focusing and collimating lens
8 input signal page data
9 reproduced signal page data
11a, 11b aperture
12 crosstalk noise

What is claimed is:

1. A holographic memory information encoding method which expresses information of signal page data in a holographic memory as a multi-stage data, the method comprising steps of: block coding and superimposing each data on a single page of signal page data using different resolution, wherein
the page data includes at least light amplitude data and phase data,
dividing the amplitude data by area through block coding, and
when n odd-numbered ON bits exist in a divided area of the amplitude data, imparting a phase of 2πs/n as s-th phase information to one value of binary data, where n and s are natural numbers, and providing the same phase for the other value of binary data.

2. The holographic memory information encoding method according to claim 1, wherein for the phase data, the block coding is 3:9 coding or 3:16 coding, and 3 ON bits exist in a divided area, a phase of 2πs/n is imparted as s-th phase information to a data signal value of 0, and the same phase is provided for a data signal value of 1.

3. A holographic memory information encoding method which expresses information of signal page data in a holographic memory as a multi-stage data, the method comprising steps of: block coding and superimposing each data on a single page of signal page data using different resolution, wherein the page data includes at least light amplitude data and phase data, dividing the amplitude data by area through block coding, and when n even-numbered ON bits exist in a divided area of the amplitude data, imparting a phase of $\pi s$ or a phase of $2\pi s/n$ as s-th phase information to one value of binary data, where n and s are natural numbers, and providing the same phase for the other value of binary data.

4. The holographic memory information encoding method according to claim 3, wherein for the phase data, the block coding is 2:4 coding or 4:9 coding, and 2 ON bits exist in a divided area, a phase of $\pi s$ or a phase of $2\pi s/n$ is imparted as s-th phase information to a data signal value of 0, and the same phase is provided for a data signal value of 1.

5. A holographic memory device which records image data as an optical interference pattern by irradiating a disk-shaped recording medium with a signal light and a reference light, and reproduces data from a reconstructed image that is obtained by irradiating the disk-shaped recording medium with a reference light, comprising a motion mechanism of an optical pickup system, a system that guides a signal light and a reference light to align the signal light and the reference light in a polarization plane on the disk-shaped recording medium, amplitude modulation means and phase modulation means provided in a light guide of a signal light, and spatial shift multiplex recording means by displacement of a reference light using the motion mechanism of an optical pickup system, wherein the phase modulation means, when n odd-numbered ON bits exist in an area for which holographic amplitude data is divided by block coding, imparts a phase of $2\pi s/n$ (where n and s are natural numbers) as s-th phase information to one value of binary data, and imparts the same phase to the other value of binary data.

6. A holographic memory device which records image data as an optical interference pattern by irradiating a disk-shaped recording medium with a signal light and a reference light, and reproduces data from a reconstructed image that is obtained by irradiating the disk-shaped recording medium with a reference light, comprising a motion mechanism of an optical pickup system, a system that guides a signal light and a reference light to align the signal light and the reference light in a polarization plane on the disk-shaped recording medium, amplitude modulation means and phase modulation means provided in a light guide of a signal light, and spatial shift multiplex recording means by displacement of a reference light using the motion mechanism of an optical pickup system, wherein the phase modulation means, when n even-numbered ON bits exist in an area for which holographic amplitude data is divided by block coding, imparts a phase of $\pi s$ or a phase of $2\pi s/n$ (where n and s are natural numbers) as s-th phase information to one value of binary data, and imparts the same phase to the other value of binary data.

7. The holographic memory device according to claim 5, further comprising a confocal optical system, wherein a multiplexing number is increased by removing a high-frequency component in recording using the confocal optical system mentioned above and passing only a signal component in reproduction to reduce crosstalk noise.

8. The holographic memory device according to claim 6, further comprising a confocal optical system, wherein a multiplexing number is increased by removing a high-frequency component in recording using the confocal optical system mentioned above and passing only a signal component in reproduction to reduce crosstalk noise.

9. The holographic memory information encoding method according to claim 1, the method comprising at least the steps of:

increasing an amount of information of a single page of page data, performing spatial shift multiplex recording, and removing a high-frequency component in recording using a confocal optical system and passing only a signal component in reproduction to reduce crosstalk noise.

10. The holographic memory information encoding method according to claim 3, the method comprising at least the steps of:

increasing an amount of information of a single page of page data, performing spatial shift multiplex recording, and removing a high-frequency component in recording using a confocal optical system and passing only a signal component in reproduction to reduce crosstalk noise.

* * * * *